United States Patent Office 3,004,030
Patented Oct. 10, 1961

3,004,030
LEUCO-SULFURIC ACID ESTERS OF DYESTUFFS OF THE BENZANTHRONE-PYRAZOLANTHRONE SERIES
Ernst Spietschka, Wiesbaden-Biebrich, and Hans Schlichenmaier, Lindau (Bodensee), Germany, assignors to Farbwerke Hoechst Aktiengesellschaft vormals Meister Lucius & Brüning, Frankfurt am Main, Germany, a corporation of Germany
No Drawing. Filed Aug. 5, 1958, Ser. No. 753,213
Claims priority, application Germany Aug. 9, 1957
6 Claims. (Cl. 260—275)

The present invention relates to valuable new leuco sulfuric acid esters of dyestuffs of the benzanthrone pyrazolanthrone series containing an alkoxy group in the pyrazolanthrone radical of the dyestuff molecule and to a process for preparing the same; more particularly the invention relates to the leuco-sulfuric acid esters of the following dyestuffs

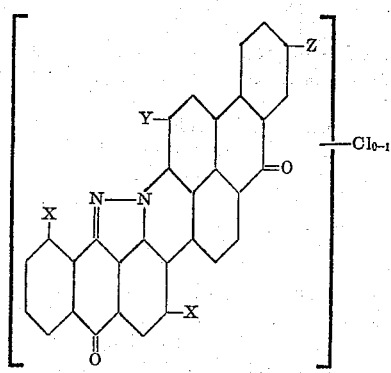

wherein one X stands for hydrogen and the other X stands for a lower alkoxy group, Y represents hydrogen, lower alkyl or phenyl, and Z represents hydrogen or bromine.

We have found that valuable leuco-sulfuric acid esters of dyestuffs of the benzanthrone-pyrazolanthrone series are obtained by converting a dyestuff of the benzanthrone-pyrazolanthrone series containing one or more alkoxy groups in the pyrazolanthrone radical of the dyestuff molecule, into its leuco-sulfuric acid ester according to known methods.

The blue dyeings produced on cotton or other vegetable fibers with the new leuco-sulfuric acid esters by the usual methods of application possess good to very good fastness properties, especially an excellent fastness to chlorine and resistance to oxidation. The esters are also suitable for printing. The stability of the leuco-sulfuric acid esters obtainable by the present invention is very good. The esters can be prepared with very good yields.

The benzanthrone-pyrazolanthrones used as starting materials, which contain one or more alkoxy groups in the pyrazolanthrone radical, can be prepared according to the processes described in German Patents Nos. 1,000,-383 and 1,025,880 by reacting alkoxy-pyrazolanthrones with Bz-1-halogen-benzanthrones in alkylformamides or dimethylsulfoxide at raised temperatures, and subsequently melting the products so obtained with alkaline condensing agents, as disclosed in German Patent No. 1,005,665.

U.S. Patent No. 2,647,899 describes leuco-sulfuric acid esters of mono- and dimethylated benzanthrone-pyrazolanthrones which, however, possess only a low substantivity for cotton, and yield, after developing and soaping, very weak grey-blue dyeings. As compared with the dyestuffs described in the aforesaid U.S. patent, the leuco-sulfuric acid esters obtainable by the present invention are distinguished by an excellent affinity for cotton. Other leuco-sulfuric acid esters of dyestuffs of the benzanthrone-pyrazolanthrone series have, hitherto, not been described in literature.

The following examples serve to illustrate the invention but they are not intended to limit it thereto, the parts being by weight.

Example 1

16 parts of chlorosulfonic acid are dropped into 200 parts of pyridine at a temperature between 0° and 5° C., and a mixture of 13 parts of benzanthrone-8-methoxy-pyrazolanthrone and 14 parts of iron powder is then introduced at the same temperature. The mixture is heated to 30°–40° C. and kept at this temperature for 3 hours. The reaction mixture is then poured on ice and sodium hydroxide solution, the pyridine is distilled off under reduced pressure and the ester is separated after filtration, for instance, by means of sodium chloride. The yield of crystalline product and the stability are very good. The full blue dyeings produced on cotton by the usual methods of application possess a very good fastness to chlorine, good general fastness properties and an excellent resistance to oxidation.

The benzanthrone-8-methoxypyrazolanthrone used as starting material is a crystalline dyestuff which dissolves in concentrated sulfuric acid to yield a violet solution, and gives a blue coloration in the vat. It can be prepared by melting N(1)-(Bz-1'-benzanthronyl)-8-methoxypyrazolanthrone, a yellow crystalline compound melting at 403°–405° C. (with decomposition), with an alkaline condensing agent.

Example 2

When the benzanthrone-8-methoxypyrazolanthrone in Example 1 is replaced by the 6'-bromo-benzanthrone-8-methoxypyrazolanthrone and the esterification is carried out in an analogous manner, there is obtained a leuco-sulfuric acid ester dyeing cotton full blue tints, which are more greenish than the tints of the ester described in Example 1.

The 6'-bromo-benzanthrone-8-methoxypyrazolanthrone is a crystalline compound which dissolves in concentrated sulfuric acid to give a violet solution, and yields a blue coloration in the vat. It can be prepared by melting N(1)-(Bz-1'-(6'-bromo)-benzanthronyl)-8-methoxy-pyrazolanthrone, a yellow crystalline compound melting at 414–415° C. (with decomposition), with an alkaline condensing agent.

Example 3

When the reaction described in Example 1 is conducted in an analogous manner with Bz-2'-ethyl-benzanthrone-8-methoxypyrazolanthrone, the leuco-sulfuric acid ester of the following dyestuff

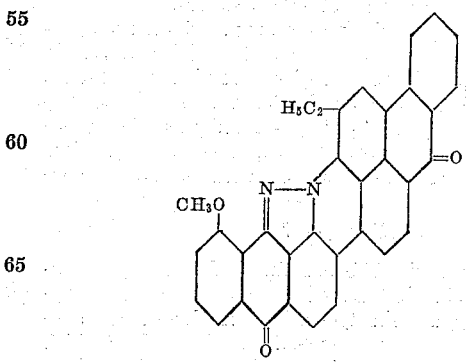

is obtained which, when developed on cotton, yields full greenish blue dyeings possessing very good fastness properties.

The Bz - 2' - ethyl - benzanthrone - 8 - methoxypyrazolanthrone dissolves in concentrated sulfuric acid to give a brown-violet solution, and yields a blue coloration in the vat. It can be obtained by melting N(1)-(Bz-1'-(Bz-2'-ethyl)-benzanthronyl)-8-methoxypyrazolanthrone, a yellow crystalline compound melting at 342°–346° C., with an alkaline condensing agent.

Example 4

10.5% of chlorine are introduced into the Bz-2'-ethyl-benzanthrone-8-methoxypyrazolanthrone indicated in Example 3 by treating this compound with sulfuryl chloride in nitrobenzene. When this compound is converted into the leuco-sulfuric acid ester as disclosed in Example 1, a dyestuff is obtained which yields, when developed on cotton, full blue dyeings which are less greenish than the dyeings described in Example 3.

Example 5

When the esterification is carried out as described in Example 1 with Bz-2'-isopropylbenzanthrone-8-ethoxypyrazolanthrone, the leuco-sulfuric acid ester of a dyestuff having the following formula

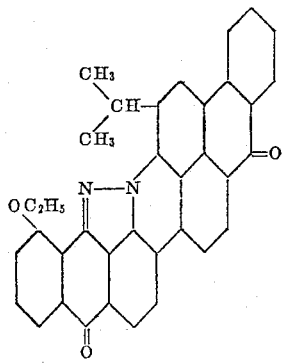

is obtained which dyes cotton by the usual methods of application clear full greenish blue shades of very good fastness properties.

The Bz - 2' - isopropyl - benzanthrone - 8 - ethoxypyrazolanthrone represents a crystalline dyestuff which dissolves in concentrated sulfuric acid to give a violet solution, and yields a blue coloration in the vat. It is obtained by melting the condensation product of 8-ethoxypyrazolanthrone melting at 308–310° C., with Bz-1-chloro-Bz-2-isopropyl-benzanthrone, a yellow crystalline compound having a melting point of 300–303° C., with an alkaline condensing agent.

Example 6

When the benzanthrone-8-methoxypyrazolanthrone in Example 1 is replaced by Bz-2'-phenyl-benzanthrone-8-methoxypyrazolanthrone, and the esterification is conducted in an analogous manner, a leuco-sulfuric acid ester is obtained which, when developed in the usual manner, dyes vegetable fibers blue-green shades.

The Bz - 2' - phenyl - benzanthrone - 8 - methoxypyrazolanthrone is a crystalline dyestuff which dissolves in concentrated sulfuric acid to give a red-brown solution, and yields a blue coloration in the vat. It can be prepared by melting N(1)-(Bz-1'-(Bz-2'-phenyl)-benzanthronyl)-8-methoxypyrazolanthrone, a yellow crystalline compound melting at 360–361° C., with an alkaline condensing agent.

Example 7

When in Example 1 benzanthrone-3-methoxypyrazolanthrone is used instead of benzanthrone-8-methoxypyrazolanthrone, and the dyestuff is esterified in an analogous manner, a leuco-sulfuric acid ester is obtained which dyes cotton according to the usual methods green-blue shades which are distinguished by good fastness properties.

The benzanthrone-3-methoxypyrazolanthrone dissolves in concentrated sulfuric acid to give a grey-green solution, and yields a blue coloration in the vat. It is obtained by melting N(1)-(Bz-1'-benzanthronyl)-3-methoxypyrazolanthrone, a yellow crystalline compound melting at 350–351° C., with an alkaline condensing agent.

Example 8

The Bz - 2' - ethyl - benzanthrone - 8 - methoxypyrazolanthrone used as starting material in Example 3 is treated with sodium chlorate and hydrochloric acid to introduce about 1 chlorine atom per molecule of dyestuff. When this compound is converted into the leuco-sulfuric acid ester as described in Example 1, a dyestuff is obtained which yields, when developed on cotton in the usual manner, full greenish blue dyeings of very good fastness properties.

Example 9

The Bz - 2' - isopropyl - benzanthrone - 8 - methoxypyrazolanthrone is converted into its leuco-sulfuric acid ester as described in Example 1. A dyestuff is obtained which dyes cotton full blue shades of very good fastness properties. The dyeings are less greenish than those obtained according to Example 5.

The Bz - 2' - isopropyl - benzanthrone - 8 - methoxypyrazolanthrone is a homogeneous crystalline compound which dissolves in concentrated sulfuric acid to give a dirty violet solution, and yields a blue coloration in the vat. It is obtained by melting N(1)-(Bz-1'-(Bz-2'-isopropyl) - benzanthronyl) - 8 - methoxypyrazolanthrone, a yellow crystalline compound melting at 356–357° C., with an alkaline condensing agent.

Example 10

The Bz - 2' - isopropyl - benzanthrone - 8 - methoxypyrazolanthrone used as starting material in Example 9 is treated with sodium chlorate and hydrochloric acid so that about 1 chlorine atom is introduced into the molecule. The compound is then converted into the leuco-sulfuric acid ester of the dyestuff having the following formula

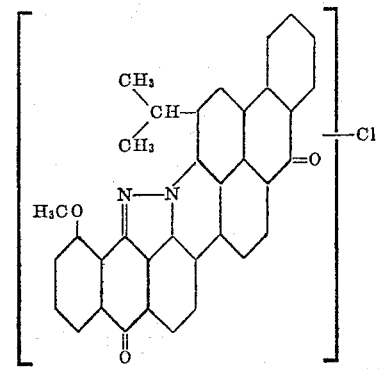

When developed on cotton, it yields greenish blue dyeings of good properties of fastness.

We claim:
1. The leuco-sulfuric acid esters of dyestuffs having the following formula

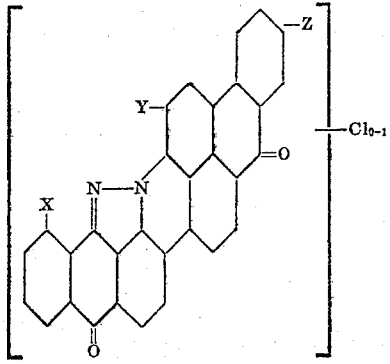

wherein X stands for a lower alkoxy group, Y represents a member selected from the group consisting of hydrogen, lower alkyl and phenyl, and Z represents a member selected from the group consisting of hydrogen and bromine.

2. The leuco-sulfuric acid ester of a dyestuff having the following formula

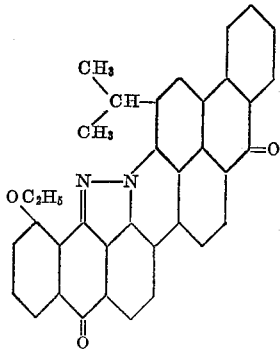

3. The leuco-sulfuric acid ester of a dyestuff having the following formula

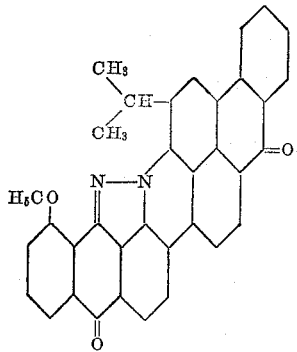

4. The leuco-sulfuric acid ester of a dyestuff having the following formula

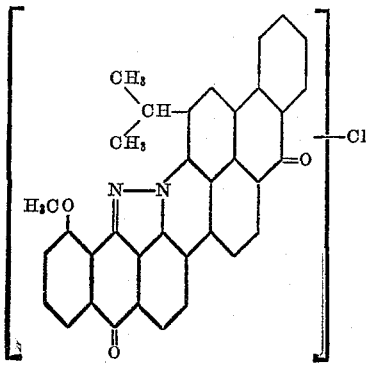

5. The leuco-sulfuric acid ester of a dyestuff having the following formula

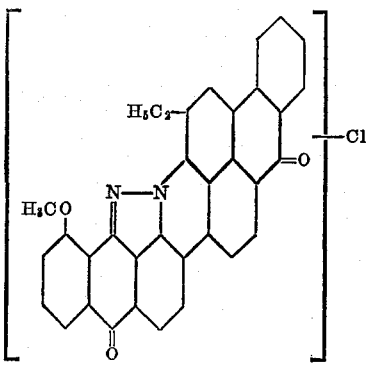

6. The leuco-sulfuric acid ester of a dyestuff having the following formula

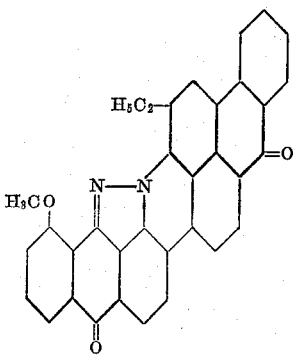

References Cited in the file of this patent
UNITED STATES PATENTS

| | | |
|---|---|---|
| 1,878,050 | Wilke | Sept. 20, 1932 |
| 2,647,899 | Randall | Aug. 4, 1953 |
| 2,882,272 | Schlichenmaier et al. | Apr. 14, 1959 |

OTHER REFERENCES

Venkataraman: Synthetic Dyes, vol. 1, p. 272 and vol. 11, page 993 (1952).